J. C. WILSON.
Wheel Cultivator.
No. 29,027
Patented July 3, 1860.
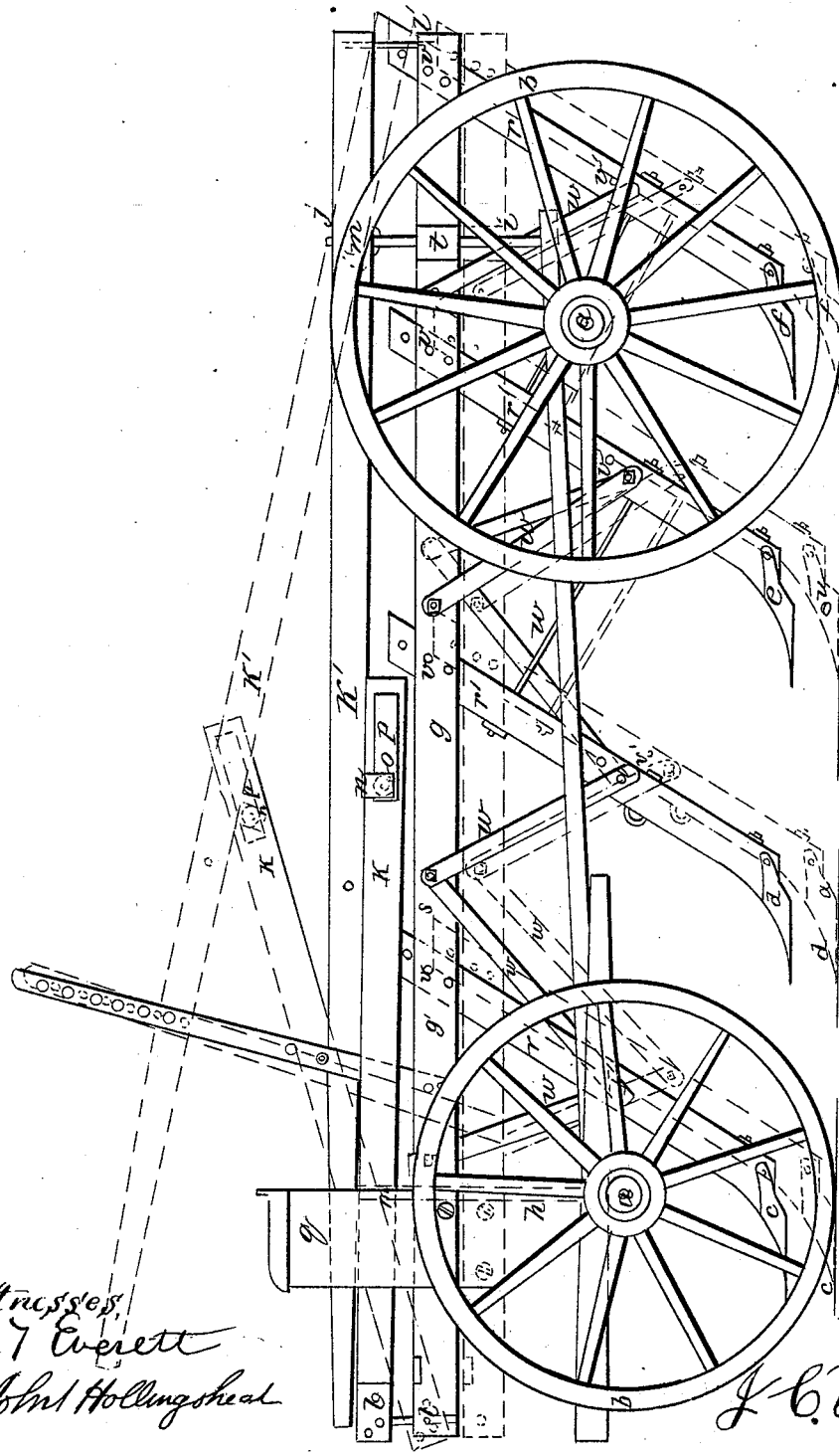

UNITED STATES PATENT OFFICE.

J. C. WILSON, OF CEDAR HILL, TEXAS.

IMPROVEMENT IN GANG-PLOWS.

Specification forming part of Letters Patent No. 29,027, dated July 3, 1860.

*To all whom it may concern:*

Be it known that I, J. C. WILSON, of Cedar Hill, in the county of Dallas and State of Texas, have invented a new and useful Improved Tier Wagon-Plow; and I do hereby declare that the following is a full, clear, and exact description thereof, reference being had to the accompanying drawing, and to the letters and marks thereon.

My invention can be used in plowing lands of almost every character; but it is particularly designed for plowing prairies or extensive tracts of lands, and in countries where it may be desirable to carry the tools and implements for cultivating the soil from one tract to another.

As is shown by the drawing forming part of this specification, I attach my tier of plows to the axles $a$ and wheels $b$ of an ordinary wagon. By doing this I save the expense which is always incurred when these parts are made permanent as a part of the plow, and any individual having the usual running-gear of a wagon will be enabled at a small cost to fit my plow to it, and thus have the one gear answer both for a plow and a wagon.

The one figure of the drawing shows the plow in the two different positions of use and at rest, the first being indicated by the red lines and the second by the black lines.

When the team is hitched to the wagon in the ordinary way the front plow, $c$, will make that furrow which is in line with the off-horse, that horse walking in the furrow and the team taking the usual track. Then the plow $d$ will fill the furrow made by the plow $c$, and $e$ that of $d$, and $f$ that of $e$, each plow filling the furrow of the plow immediately preceding it.

The plow-frame $g$ is put on the wagon and secured thereby having three rods or bars of iron, $h\ i\ j$, which are made fast to the wagon. One of these rods, $h$, passes through the coupling-hole in the front axle, and has a collar on it that rests on the top of the sand-bolster. It has also a screw and tap that screws on the under side of the axle. The other rods, $i$ and $j$, are fastened in the same way to the hind axle or to the hounds. The plow-frame can be raised up and down on these vertical rods, they serving as fulcrums to the double-acting levers $k\ k'$, which are fastened to the main frame before and behind by loop-hinges $l\ l'$. The levers are attached to their fulcrums by a hole in the top of the rods, into which the pivots $m\ m$ of the levers work. The hind and front parts of the lever are connected at about the center of the wagon by means of ear-hinges $n$, which are placed in the hind lever, holding between them a friction-roller, $o$, which works in a slot, $p$, in the front lever. The hind lever, $k'$, is long enough to pass the driver's seat $q$ on the front part of the frame, so that when the plowman wishes to raise the plows out of the ground for any purpose he can put his hand on the front part of the lever, and pressing it downward can raise all the plows to the desired distance above the ground.

The main frame has one beam, $g'$, that goes straight back, to which the front helve-piece, $r$, is fastened. The other beam, $g$, is attached to the side of the beam $g'$ at $s$, and stands off obliquely, and is fastened to the first-named beam, near the back part of the frame, by a cross-piece, $t$. This oblique departure from the straight beam leaves sufficient space for all the plows desired to be used, and each plow, when arranged on the oblique beam, will cut a full furrow.

The plows are bolted to the helve-pieces, as shown by the drawing. The bar $u$ of the plows is crooked in such manner that it can be securely fastened to the helve-piece, more so than if it were made straight, and the short crooked-up part lessens the friction of the bars on the ground. The helves $r'$ are fastened to the main frame by braces and bolts, the helve-pieces being cut so that they will stand square with the main frame when bolted to the oblique beam. The oblique beam is also shaped so that when the helves are set at the proper angle forward they will stand plane or square with the frame. The helves have a number of holes, $v$, through their upper ends, and also at $v'$, where the braces $w$ are fastened to them, so that by taking out the bolts the helve can be moved up or down to suit the depth the ground is wanted to be plowed. This, however, is necessary only for extra-deep plowing, as the adjustment for ordinary plowing can be effected by the levers. As is shown by the drawing, the helves are firmly attached to the main frame by the braces $w$, which are so arranged as to strengthen the frame instead of weakening it, inasmuch as at the same point where the one brace is pulling down another is lifting up from the force against the plow in front.

What I claim as new, and desire to secure by Letters Patent, is—

The arrangement of the plow-frame upon the wagon-frame, as and for the purpose herein described.

This specification signed this 11th day of June, 1860.

J. C. WILSON.

Witnesses:
T. T. EVERETT,
JOHN S. HOLLINGSHEAD.